3,419,511
PLASTICIZED POLYVINYL CHLORIDE COMPOSITIONS CONTAINING AN ACRYLONITRILE-BUTADIENE RUBBER AND FLEXIBLE, OIL RESISTANT FILMS AND SHEETS PRODUCED THEREFROM
Albert C. Condo, Newton Square, Pa., and William E. Mendham, Lyndeborough, N.H., assignors to The Atlantic Refining Company, Philadelphia, Pa., a corporation of Pennsylvania
No Drawing. Filed July 19, 1965, Ser. No. 473,182
8 Claims. (Cl. 260—22)

ABSTRACT OF THE DISCLOSURE

This invention relates to a polyvinyl chloride composition containing an acrylonitrile-butadiene rubber having about 20 weight percent bound acrylonitrile and a liquid polyester plasticizer of adipic acid and 1,3-butylene glycol. These polyvinyl chloride compositions have a unique combination of outstanding low temperature properties coupled with high oil extraction resistance.

---

This invention relates to a new class of plasticized polyvinyl chloride compositions and to flexible oil resistant sheets and films manufactured from such compositions which retain their flexibility and, consequently, their impact resistance after prolonged exposure to oil environments at temperatures of the order of —30° F. and below.

The flexibility of polyvinyl chloride films and sheets is normally determined by the amount and type of plasticizer employed. Generally speaking, the higher the plasticizer content in the film, the greater the flexibility of the film.

Plasticizers for polyvinyl chloride may be divided into two general classes, monomeric and polymeric. In general, monomeric plasticizers have molecular weights of less than 1000. Examples of commercially available monomeric plasticizers for polyvinyl chloride are dioctyl phthalate, dioctyl adipate and dioctyl sebacate.

Polymeric plasticizers have molecular weights of several thousand, and are characterized by long chains of recurring structural units. Examples of commercially available polymeric plasticizers are the polyesters formed by condensing a dibasic acid with a glycol.

In a film or sheet formed of a plasticized polyvinyl chloride composition, the plasticizer acts as a lubricant and allows the polyvinyl chloride polymer chains to slide over one another. This phenomenon is generally referred to as flexibility. As the temperature of the plasticized polyvinyl chloride film or sheet is lowered, the plasticizer (as well as the polyvinyl chloride) becomes significantly more rigid and less capable of acting as a lubricant. At some temperature, the plasticizer can no longer function as a lubricant and consequently the polyvinyl chloride film becomes rigid and brittle. At this point the film has very little impact resistance and will fail upon the application of an impact force. The temperature at which this failure occurs is herein referred to as the "brittleness temperature." A more comprehensive definition of the quoted term is set forth in ASTM D–1790, which is herein incorporated by reference.

When a plasticized polyvinyl chloride composition is brought in contact with a liquid which is a solvent for the plasticizer, the plasticizer nearest the fluid interface is drawn into solution. Due to the concentration gradient created near the interface, the remaining plasticizer migrates through the composition and is then extracted by the solvent. This extraction causes the composition to become rigid and brittle after a prolonged contact period.

In certain applications, it is necessary that a polyvinyl chloride film or sheet be characterized both by low temperature impact strength and good resistance to plasticizer extraction in oil. For example, in a copending application, Ser. No. 472,774, filed July 19, 1965, plasticized polyvinyl chloride film is used in the production of form-fill-and-seal packages containing motor oil or similar products which are exposed to low temperatures during handling. In addition to the low temperature and solvent resistant properties, it is necessary that the films be characterized by good weldability, heat stability and sunlight resistance. Such a combination of properties, although long sought after, has not, to the best of our knowledge, ever been imparted to plasticized polyvinyl chloride film and sheet.

Unexpectedly, we have discovered that when a certain combination of a specific plasticizer and a specific type of rubber are added to polyvinyl chloride in certain proportions, the resultant composition may be employed to provide films and sheets which retain their resistance to impact at temperatures of the order of —30° F. and below, and which possess a high degree of plasticizer extraction resistance when subjected to plasticizer solvent environments.

Briefly stated, the composition of our invention comprises, in parts by weight, (a) 100 parts of polyvinyl chloride; (b) from about 20 to about 50 parts of an acrylonitrile-butadiene rubber containing about 20 weight percent of acrylonitrile; and (c) from about 30 to about 60 parts of a liquid polyester of adipic acid and 1,3-butylene glycol, having an average molecular weight of at least 1000; the sum of the parts of (b) and (c) ranging from about 56 to about 80.

In accordance with our invention, it has been found that such highly desirable properties are obtained only when the particular rubber and particular polyester identified above are employed with polyvinyl chloride in the proportions specified. In this connection, we have found that the use of rubbers other than an acrylonitrile-butadiene rubber is unsatisfactory. Similarly, the use of an acrylonitrile-butadiene rubber having an acrylonitrile content substantially below (or substantially above) about 20 weight percent is also unsatisfactory in the production of the compositions of this invention. Furthermore, we have discovered that the use of a polyester of adipic acid and 1,3-butylene glycol in the proportions specified above is critical to the successful practice of the present invention. For example, we have found that polyesters produced from 1,3-butylene glycol and an acid other than adipic acid are entirely unsatisfactory for the purposes specified. Also, we have discovered that the use of a glycol other than 1,3-butylene glycol with the adipic acid results in a polyester which is not equivalent to the polyester of adipic acid and 1,3-butylene glycol insofar as its use in the production of the compositions of this invention is concerned.

In accordance with our invention the addition of the acrylonitrile-butadiene rubber and the polyester to the polyvinyl chloride may be accomplished in any manner so long as a thorough distribution of the two additives in the polyvinyl chloride is obtained. For example, the mixing of the materials may be accomplished by any one of the variety of methods normally employed for the incorporation of plasticizers or fillers into thermoplastic polymers, including, but not limited to, mixing rolls, doughmixers, Banbury mixers, blenders and other mixing equipment. The resulting mixtures may be handled in any conventional manner employed for the fabrication or manipulation of thermoplastic resins. The materials may be formed or molded using compression, injection, calendering and extrusion techniques. It should be understood that the polyvinyl chloride resin mixtures prepared in accordance with this invention may also contain, in addition to a specific rubber and the specific polyester defined above, other additives to lubricate, prevent degradation, or lend color to the material. Common examples of these additives include heat stabilizers, pigments, fillers, ultraviolet light stabilizers, impact improvers, secondary plasticizers, lubricants and antioxidants. These additives are well-known in the art, and may be incorporated without departing from the scope of the invention.

The compositions of this invention are particularly suitable in providing sheets or films, as for example, by extrusion, or by calendering, which are characterized by good flexibility, and consequently good impact resistance at temperatures of the order of −30° F. and below, as well as a high degree of plasticizer extraction resistance when used in plasticizer solvent environments. Additionally, films or sheets produced from the compositions of the invention are characterized by good weldability, good heat stability and good sunlight resistance. For example, the calendered sheets produced from the composition of the invention are generally characterized by the following properties:

| | |
|---|---|
| Brittleness temperature_____pass__ | −40° F. |
| Oil extraction weight loss_____ | <1% |
| Dielectric loss factor (60 mcs.)_____ | .047 |
| RF weldability_____ | Positive |
| Tensile strength (p.s.i.)_____ | 3000 |
| Modulus 100%_____ | 2000 |
| Elongation percent_____ | 350 |

The fact that the addition of an acrylonitrile-butadiene rubber and polyester of adipic acid and 1,3-butylene glycol to a polyvinyl chloride resin system in the proportions specified above results in a resin mixture, which, in film or sheet form, remains flexible and is resistant to impact at temperatures of −30° F. and below, and has outstanding resistance to plasticizer extraction when immersed in plasticizer solvent environments is totally unexpected and is not fully understood. For example, it is well-known that monomeric plasticizers impart low brittle points to polyvinyl chloride film, but are handicapped by virtue of the fact that they are readily extracted from the polyvinyl chloride by organic solvents in which the monomeric plasticizers are soluble. On the other hand, polymeric plasticizers, though affording a considerably higher degree of extraction resistance, are handicapped by virtue of their inability to impart low brittle points to polyvinyl chloride. It was also previously thought that the incorporation of rubber into polyvinyl chloride would not lower the brittle point of the composition to any appreciable degree. Therefore, one skilled in the art would predict that a polyvinyl chloride composition containing monomeric plasticizer would have a much lower brittle point than a similar composition containing a polymeric plasticizer. This prediction is supported by the results set forth in Table I which show that the compositions containing monomeric plasticizer have a much lower brittle point (−60° F. and −11° F.) than the composition containing the polyester plasticizer (+24° F.). Furthermore, as shown in Formulation No. 5, the incorporation of rubber into these compositions would not be expected to change the respective brittle points to any appreciable degree. In Table II, it is shown that the polyvinyl chloride composition containing monomeric plasticizer and rubber fails at a brittleness temperature of −30° F. as predicted. However, quite unexpectedly, the polyvinyl chloride compositions containing the polyester plasticizer and rubber pass a brittleness test at −40° F. Therefore, an unpredicted decrease in brittleness temperature of at least 60° F. is obtained when the acrylonitrile-butadiene rubber is incorporated into the polyester plasticized polyvinyl chloride. Therefore, as a result of our invention, it is now possible to obtain a polyvinyl chloride composition having outstanding low temperature properties co-existent with a high degree of plasticizer extraction resistance.

In general, any of the commercially available film-forming polyvinyl chloride resins may be employed in the preparation of the composition of the present invention. On the other hand, as noted above, the type of rubber employed is critical and must be an acrylonitrile-butadiene rubber containing about 20 percent by weight of acrylonitrile in order to obtain homogeneous compositions having brittleness temperatures of −30° F. and below. Although the initial Mooney viscosity (ML No. 4 at 212° F.) of the specific acrylonitrile-butadiene rubber used in the practice of the invention may vary throughout a wide range, we have found that acrylonitrile-butadiene rubber having initial Mooney viscosities of from about 20 to 100, and preferably from about 40 to about 80 are more easily blended with the polyvinyl chloride resin during the compounding operation.

As noted above, the amount of acrylonitrile-butadiene rubber used to provide the composition of the invention is critical. In this regard, we have found that from about 20 to about 50 parts by weight of rubber per 100 parts by weight of polyvinyl chloride should be employed. Compositions containing less than about 20 parts of rubber per 100 parts of polyvinyl chloride have been found to exhibit poorer flexibility at low temperatures, whereas compositions containing more than about 50 parts of rubber per 100 parts of polyvinyl chloride are not readily fabricated into film and sheet form.

The plasticizer used in the practice of the invention must be the condensation product of adipic acid and 1,3-butylene glycol. This polyester must be a liquid at room temperature, and have an average molecular weight of at least about 1000 and preferably about 3500. Preferably, the polyester is chain terminated with an aliphatic monobasic acid of the formula $CH_3(CH_2)_nCOOH$ wherein $n$ is an integer from 10 to 16 inclusive. Examples of such acids are lauric, tridecoic, myristic, pentadecanoic, palmitic, margaric and strearic acids. The most preferred polyester is one formed by the condensation of adipic acid and 1,3-butylene glycol having a molecular weight of approximately 3500 and terminated with palmitic acid. This polyester may be represented as follows:

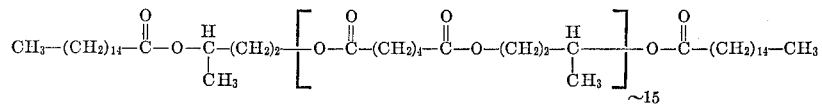

The polyesters of this invention may be prepared by condensing 1,3-butylene glycol and adipic acid in the presence of zinc chloride at elevated temperatures in the absence of air. A suitable method is set forth in the article of Kiroly and Beavers, Journal of Industrial and Engineering Chemistry, vol. 45, pages 1060 to 1063 (1953), which is hereby incorporated by reference as part of this specification.

The amount of polyester plasticizer employed is critical to the successful practice of the invention. In this connection, we have found that some 30 to 60 parts by weight of polyester per 100 parts of polyvinyl chloride must be employed to attain brittleness temperatures of −30° F. and below.

We have also discovered that the sum of the parts of acrylonitrile-butadiene rubber and the aforesaid polyester in the compositions of the invention must range from about 56 to about 80, based upon 100 parts of polyvinyl chloride. Total loadings of polyester and rubber exceeding 80 parts by weight per 100 parts of polyvinyl chloride cannot be readily processed into film and sheet form, whereas compositions containing a total loading of polyester and rubber of less than 56 parts do not provide films and sheets exhibiting brittle temperatures of −30° F. and below. In general, we have found that the use of approximately 25 parts by weight of the acrylonitrile-butadiene rubber and about 40 parts by weight of the aforesaid polyester per 100 parts of polyvinyl chloride results in a composition which may be used for films having a particularly outstanding combination of properties.

In order that those skilled in the art may better understand how the present invention may be practiced, the following examples are given by way of illustration and not by way of limitation. All parts are by weight.

Example I

This example demonstrates the low temperature and extraction properties of prior art compositions.

The components listed in Table I were combined with about 4 parts of a heat stabilizer (a barium/cadmium organic soap sold commercially under the trade name MARK WS) and about .5 part stearic acid in a Hobart Mixer. The stock was then milled at 300° F. until a homogeneous composition was obtained and then withdrawn as a 10 mil film. A 100 mil sheet was compression molded for brittleness temperature test in accordance with ASTM D–746. The low temperature and plasticizer extraction properties are set forth in Table I.

TABLE I

| Formulation number | 1 | 2 | 3 | 4 | 5 |
|---|---|---|---|---|---|
| Polyvinyl chloride | 100 | 100 | 100 | 100 | 100 |
| Rubber [1] | | | | | 60 |
| Plasticizer: | | | | | |
| Dioctyl Phthalate (DOP) | 50 | | | | |
| Dioctyl Sebacate (DOS) | | 50 | | | |
| Polyester [2] | | | 50 | | |
| Epoxidized Oil | | | | 50 | |
| Brittleness Temperature ° F. (ASTM D–746) | −11 | −60 | +24 | +7 | +20 |
| Oil Extraction, percent weight loss [3] | 9.9 | 19.8 | 1.4 | 3.3 | 0.65 |

[1] An acrylonitrile-butadiene rubber having an acrylonitrile content of 30 weight percent.
[2] A condensation polymer of adipic acid and 1,3-butylene glycol terminated with palmitic acid; molecular weight ~3,500; viscosity at 25° C.—50 poises; refractive index at 25° C.—1.466; saponification number—500 mg. KOH/gram; specific gravity 1.08.
[3] Percent weight loss of a 10 mil sheet after immersion in mineral oil at 50° C. for 24 hours.

Formulation Nos. 1 and 2 containing monomeric plasticizers are characterized by low brittleness temperatures and extremely high plasticizer extraction in oil. Formulation Nos. 3 and 4 are plasticized with polymers and have poor low temperature properties but superior plasticizer extraction resistance. The polyester plasticizer in Formulation No. 3 which is the preferred polyester of this invention imparts a brittleness temperature of +24° F. when used alone without acrylonitrile-butadiene rubber. Formulation No. 5 represents compositions containing only rubber and polyvinyl chloride. This composition has a high brittleness temperature but a small extraction loss in oil.

Example II

This example illustrates the effect of incorporating acrylonitrile-butadiene rubber into polyvinyl chloride compositions.

The components set forth in Tables II, III, IV and V were compounded with about 4 parts of MARK WS and about .5 part stearic acid in the following manner:

The polyvinyl chloride, MARK WS and stearic acid were blended in a ribbon blender while the stock temperature was raised to 130° F. At this point, the plasticizer was added. The stock temperature was then raised to 205° F. and maintained until the composition had the appearance of a dry powder. The stock was then cooled to 140° F. and placed in a Banbury with an acrylonitrile-butadiene rubber which had been band milled at 150° F. for 10 minutes. This blend was then heated in a Banbury until it began to flux. It was then milled at 270° F. followed by calendering at 300° F. The material was removed as a 10 mil film.

TABLE II

| Formulation number | 6 | 7 | 8 | 9 |
|---|---|---|---|---|
| Polyvinyl chloride | 100 | 100 | 100 | 100 |
| Acrylonitrile-Butadiene Rubber [1] | | 25 | | 25 |
| Plasticizer: | | | | |
| Dioctyl Phthalate (DOP) | 60 | 47.5 | | |
| Polyester Plasticizer [2] | | | 60 | 47.5 |
| Brittleness Test [4] at— | | | | |
| +20° F | | | Failed | |
| +10° F | | | | |
| 0° F | | | | |
| −10° F | | | | |
| −20° F | Passed | Passed | | |
| −25° F | Failed | Passed | | |
| −30° F | | Failed | Failed | |
| −40° F | | | | Passed |
| Oil Extraction, [3] percent weight loss | 11.9 | 13.0 | 1.4 | .9 |

[1] 20 weight percent acrylonitrile.
[2] A condensation polymer of adipic acid and 1,3-butylene glycol terminated with palmitic acid; molecular weight, ~3,500; viscosity at 25° C.—50 poises; refractive index at 25° C., 1.466; saponification number—500 mg. KOH/gram; specific gravity, 1.08.
[3] Percent weight loss of a 10 mil sheet after immersion in mineral oil at 50° C. for 24 hours.
[4] ASTM D–1790.

A comparison of Formulation Nos. 6 and 7 demonstrates that the addition of rubber to a resin composition containing monomeric plasticizer depresses the brittleness temperature only five degrees. In view of this small change, it would be predicted that the incorporation of rubber into a resin containing a polymeric plasticizer would be even less effective. However, as exemplified by Formulation Nos. 8 and 9, the incorporation of rubber into a resin composition containing a specific polyester plasticizer unexpectedly depresses the brittleness point over sixty degrees to a temperature substantially below that obtained with a monomeric plasticizer.

Example III

This example illustrates the effect of plasticizer loading and the criticalness of the particular polyester structure. The formulations were prepared as in the previous example, calendered at 300° F. and removed as a 10 mil film.

TABLE III

| Formulation number | 10 | 11 | 12 | 13 |
|---|---|---|---|---|
| Polyvinyl chloride | 100 | 100 | 100 | 100 |
| Acrylonitrile-Butadiene Rubber [1] | 25 | 25 | 25 | 25 |
| Polyester Plasticizer: | | | | |
| Adipic acid/1,3-butylene glycol polyester [2] | 31.2 | 37.5 | 47.5 | |
| Adipic acid/1,2-propylene glycol polyester [5] | | | | 47.5 |
| Brittleness Test [4] at— | | | | |
| −30° F | | Passed | | Failed |
| −40° F | Failed | Passed | Passed | |

[1], [2] and [4] as defined in Table II.
[5] A condensation polymer of adipic acid and 1,2-propylene glycol terminated with palmitic acid; molecular weight, ~3,500; viscosity at 25° C.—110 poises; refractive index at 25° C., 1.466; specific gravity, 1.11.

The polyester utilized in Formulation No. 13 was formed by the condensation of adipic acid and 1,2-propylene glycol. Thus, it differed from the preferred polyester of Formulation No. 12 only by having one less carbon atom in the alcohol segment of the polymer chain. However, despite this small difference, the composition containing this plasticizer did not pass a −30° F. brittleness test.

Example IV

The criticalness of the acrylonitrile content of the rubber is shown in this example. The formulations were prepared and formed into 10 mil films as in Example II.

TABLE IV

| Formulation number | 14 | 15 | 16 | 17 |
|---|---|---|---|---|
| Polyvinyl chloride | 100 | 100 | 100 | 100 |
| Polyester Plasticizer [2] | 37.5 | 37.5 | 71.5 | 37.5 |
| Acrylonitrile-Butadiene Rubber, wt. percent acrylonitrile | 25 | 25 | 43 | 25 |
| | 20 | 28 | 28 | 40 |
| Brittleness Test [4] at— | | | | |
| 0° F | | | | Failed |
| −10° F | | | | |
| −20° F | | Failed | Failed | |
| −30° F | | | | |
| −40° F | Passed | | | |

[2] and [4] as defined in Table II.

By comparing Formulation Nos. 14, 15, 16 and 17, it is apparent that rubbers having an acrylonitrile content above about 20 percent by weight do not impart good low temperature properties to the compositions. Rubbers having acrylonitrile contents below about 20 weight percent could not be evaluated because the compositions were not homogeneous. As noted from Formulation No. 16, if the acrylonitrile content is outside the operable range, the deficiency cannot be overcome by higher plasticizer and rubber loadings.

Example V

A comparison of brittleness temperature and rubber loading is set forth in this example. The formulations were prepared and formed into 10 mil films as in Example II.

TABLE V

| Formulation number | 18 | 19 | 20 | 21 |
|---|---|---|---|---|
| Polyvinyl chloride | 100 | 100 | 100 | 100 |
| Acrylonitrile-Butadiene Rubber [1] | 17.6 | 21.9 | 25 | 31.2 |
| Polyester Plasticizer [2] | 44.6 | 47.5 | 47.5 | 37.5 |
| Brittleness Test [4] at— | | | | |
| −20° F | Passed | | | |
| −30° F | Failed | Passed | | |
| −40° F | | Failed | Passed | Passed |

[1], [2] and [4] as defined in Table II.

In order to obtain a brittleness temperature of −30° F. or lower the rubber loading must exceed about 20 parts per 100 parts polyvinyl chloride.

By virtue of the present invention there is provided a new class of plasticized polyvinyl chloride compositions which retain their flexibility and impact strength after prolonged exposure to oil environments at extremely low temperatures. Such compositions are useful for preparing gaskets, tubing and other materials, which have an improved impact resistance after being subjected to oil environments at temperatures of the order −30° F. and below. Sheets of plasticized polyvinyl chloride of the invention are useful as wrapping or packaging materials, as metal liners, containers, covers, electrical insulating tapes, and pipe coverings. The term "sheets" as used throughout the specification and claims includes thin sheets commonly referred to as films.

We claim:
1. A composition comprising in parts by weight
   (a) 100 parts of polyvinyl chloride
   (b) from about 20 to about 50 parts of an acrylonitrile-butadiene rubber containing about 20 weight percent of acrylonitrile and
   (c) from about 30 to about 60 parts of a liquid polyester of adipic acid and 1,3-butylene glycol having an average molecular weight of at least 1000; the sum of the parts of (b) and (c) ranging from about 56 to about 80.

2. The composition of claim 1 wherein the rubber content is about 25 parts and the polyester content is about 40 parts.

3. The composition of claim 1 wherein the polyester has an average molecular weight of about 3500.

4. The composition of claim 1 wherein the polyester is terminated with an acid of the formula $CH_3(CH_2)_nCOOH$ where $n$ is an integer from 10 to 16 inclusive.

5. The composition of claim 4 wherein $n$ is 14.

6. A composition having a brittleness temperature of −30° F. (ASTM D–1790) and an oil extraction loss of less than 1 percent when tested as a 10 mil sheet immersed in mineral oil at 50° C. for 24 hours comprising in parts by weight
   (a) 100 parts of polyvinyl chloride
   (b) about 25 parts of an acrylonitrile-butadiene rubber containing about 20 weight percent acrylonitrile and
   (c) about 40 parts of a liquid polyester of adipic acid and 1,3-butylene glycol terminated with palmitic acid and having an average molecular weight of about 3500.

7. A flexible sheet of the composition of claim 1.
8. A flexible sheet of the composition of claim 6.

References Cited

UNITED STATES PATENTS

| 2,053,884 | 9/1953 | Hussey et al. | 260—891 |
| 2,838,428 | 6/1958 | Bohrer | 260—31.6 |
| 2,980,642 | 4/1961 | Bushell et al. | 260—31.6 |

FOREIGN PATENTS

| 447,049 | 3/1948 | Canada. |
| 519,991 | 12/1955 | Canada. |
| 656,262 | 1/1963 | Canada. |
| 1,063,736 | 8/1959 | Germany. |

DONALD E. CZAJA, *Primary Examiner.*

R. W. GRIFFIN, *Assistant Examiner.*

U.S. Cl. X.R.

260—23, 23.7, 31.6, 40, 41, 41.5, 45, 85, 873, 891;

117—128.7, 133, 134, 138.8, 139; 260—83.1